(12) United States Patent
Nashiki

(10) Patent No.: US 6,194,804 B1
(45) Date of Patent: *Feb. 27, 2001

(54) SWITCHED RELUCTANCE MOTOR HAVING SUBSTANTIALLY CONTINUOUS TORQUE AND REDUCED TORQUE RIPPLE

(75) Inventor: Masayuki Nashiki, Niwa-gun (JP)

(73) Assignee: Okuma Corporation, Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,701

(22) Filed: Aug. 12, 1998

(30) Foreign Application Priority Data

Sep. 2, 1997 (JP) .................................................. 9-236885

(51) Int. Cl.⁷ ...................................................... H02K 19/06
(52) U.S. Cl. ........................... 310/166; 310/184; 310/168; 318/701
(58) Field of Search ..................... 310/166, 168, 310/179, 184, 269, 216, 51; 318/701, 254

(56) References Cited

U.S. PATENT DOCUMENTS

| 4,670,696 | * | 6/1987 | Byrne et al. | 318/701 |
| 4,698,537 | * | 10/1987 | Byrne et al. | 310/168 |
| 4,888,513 | * | 12/1989 | Fratta | 310/216 |
| 5,296,785 | * | 3/1994 | Miller | 318/254 |
| 5,801,478 | * | 9/1998 | Nashiki | 310/261 |
| 5,814,965 | * | 9/1998 | Randall | 318/701 |

FOREIGN PATENT DOCUMENTS

| 5-219701 | * | 8/1993 | (JP) | 310/166 |
| 8-037791 | * | 2/1996 | (JP) | 310/166 |

* cited by examiner

*Primary Examiner*—Karl Tamai
(74) *Attorney, Agent, or Firm*—Oliff & Berridge, PLC (57) ABSTRACT

A motor with small ripple and capable of high-speed rotation includes six stator poles having widths of about 60 degrees, which is less than 60 degrees when converted to rotor rotational angle. Excitation windings (HA3, HA4, and so forth) wound around the stator poles are connected in series with adjacent excitation winding connected in reverse series. Torque windings (HA1, HA2, and so forth) wound around the stator poles have three phases, where each phase winding comprises a pair on opposite sides with respect to the center of rotor rotation, separated from each other by 180 degrees, and connected in reverse series. In addition, two rotor poles (3) having widths from 60 degrees to 120 degrees when converted to the rotor rotational angle are provided.

14 Claims, 11 Drawing Sheets

SWITCHED RELUCTANCE MOTOR HAVING SUBSTANTIALLY CONTINUOUS TORQUE AND REDUCED TORQUE RIPPLE

BACKGROUND OF THE INVENTION

1. Field of the Invention

The present invention relates to motors, in particular low cost motors, and to improvements to motors usable as general-purpose industrial motors, and furthermore to motors useful as high rotational speed motors in which centrifugal force becoming a problem in terms of rotor strength.

2. Description of the Related Art

When it is necessary to rotate a motor at high speeds, such as the high-speed main shaft of a machine tool in a machining center, the motor's rotor with a diameter of about 100 mm must reach speeds of at least 30,000 rpm. Although induction motors are used for this sort of application, the slots of the rotor are not opened and are often closed to withstand the centrifugal force, and the rotor coil ends are also often reinforced. In any case, the cost increases and a reinforced construction that somewhat sacrifices the motor characteristics is often employed.

Figure 10:
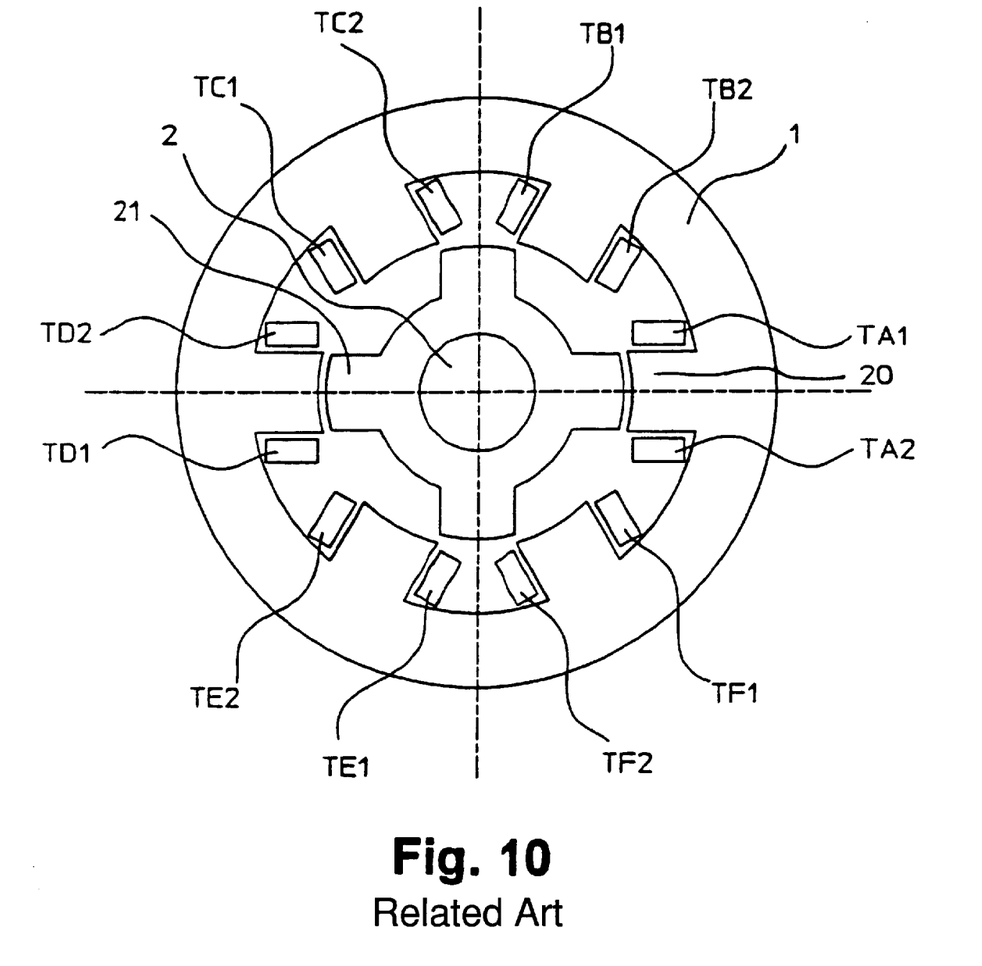
FIG. 10 illustrates an example of a conventional switched reluctance motor.

Switched reluctance motors, which have high rotor strength, have been researched and some have been put into actual use. A typical example of an actual motor is shown in FIG. 10. A rotor 2 is a simple silicon steel plate and extremely strong so as to be suitable for high-speed rotation.

A stator 1 has six salient poles 20 and the width of each salient pole 20 is approximately 30 degrees when converted to the rotor rotational angle. Each salient pole 20 is wound with windings TA1, TA2, TB1, TB2, TC1, TC2, TD1, TD2, TE1, TE2, TF1, and TF2. The rotor 2 has four salient poles 21 and the width of each salient pole 21 is approximately 30 degrees when converted to the rotor rotational angle.

The operation of the switched reluctance motor is described next. For example, when generating a rotational torque in the counterclockwise direction in the state of FIG. 10, current is passed through the windings indicated by TC1 and TC2, and TF1 and TF2 so that the salient poles 21 of rotor 2 are attracted to generate a rotational torque. At this time, the current flowing through the windings indicated by TC1 and TC2 and the current flowing through the windings indicated by TF1 and TF2 have opposite directions, and the currents flow so that the generated magnetic flux passes through the rotor 2. Furthermore, while the rotor 2 rotates in the counterclockwise direction, the rotational torque is not generated when the salient poles 21 of rotor 2 reach the position of the stator pole wound with windings TC1 and TC2. At this time, since the adjacent rotor salient pole in the counterclockwise direction approaches the stator salient pole wound with windings indicated by TE1 and TE2, setting the current in the windings TC1 and TC2 to zero, and at the same time passing current in the windings indicated by TE1 and TE2 and the windings indicated by TB1 and TB2 causes a rotational torque to be generated in the counterclockwise direction. In this manner, passing an appropriate intermittent current in sequence to each stator winding enables a continuous rotational torque to be generated. Simultaneously, when generating a rotational torque in the clockwise direction in the state of FIG. 10, current is passed through the windings indicated by TB1 and TB2 so that the salient poles of rotor 2 are attracted to generate a rotational torque.

The generated torque is related to the current in the windings and the relative positions of the stator 1 and rotor 2, and in theory is unrelated to the rotational speed of the rotor.

Characteristics of this switched reluctance motor include a low fabrication cost due to a simple motor construction and a simple winding structure of the stator windings, a relatively short-motor length because the coil ends of the stator windings can be shortened, a durable rotor making it physically possible for high-speed rotation, and a drive circuit that can be simplified since the drive algorithm is simple and only one direction of current is sufficient.

On the other hand, the switched reluctance motor also has a number of shortcomings. When the control algorithm to even the relationship of the supplied electrical energy, the magnetic energy stored in the motor, and the mechanical output energy has not been established, the result is a large torque ripple. One method that has been proposed to solve this is to compensate for the current so as to compensate for torque ripple, thus reducing torque ripple. However, this method introduces other problems, such as the requirement of a complex control method. In addition to torque ripple, the intermittent torque generated by each salient pole also affects in terms of motor strength the stator deformation, and vibration and noise when the motor is driven are large. Furthermore, other problems include the requirement of high-speed current control and the requirement of extremely high-speed current switching for the high-speed rotation of the four-pole motor compared to that for the two-pole motor. Furthermore, there is the problem of the power factor since it is necessary to frequently perform the supply and regeneration of magnetic energy in the motor.

SUMMARY OF THE INVENTION

According to the present invention, a two-pole motor is proposed in which the torque generated at each rotor salient pole is continuous and torque ripple is not generated from the basic algorithm, and in which there is no input or output of magnetic energy in the motor as seen from the drive apparatus. The motor also has low vibration and low noise.

The motor of the present invention includes six stator poles having widths of about 60 degrees, which is less than 60 degrees when converted to the rotor rotational angle.

The excitation windings wound around each stator pole are connected so that adjacent excitation windings are in reverse series. Namely, the excitation windings are wound in opposite directions to each other and then connected in series. The torque windings wound around each stator pole have three phases, where each phase winding comprises a pair on opposite sides with respect to the center of rotor rotation, separated from each other by 180 degrees, and connected in reverse series. In addition, two rotor poles having widths from 60 degrees to 120 degrees when converted to the rotor rotational angle are provided.

Another motor of the present invention is the same as the above-mentioned motor but with common stator windings wound around each stator pole.

A rotor provided with holes or grooves to limit the total magnetic flux of the rotor poles on the outer perimeter of the rotor, or a rotor construction in which air-gaps are provided or non-magnetic materials, such as stainless steel, are provided to limit the total magnetic flux of the rotor poles between electromagnetic steel plates of the rotor laminated along the direction of the rotor shaft are also proposed.

A rotor fabricated from an electromagnetic steel plate with a saturation magnetic flux density lower than the saturation magnetic flux density of the electromagnetic steel plate of the stator is also proposed.

The two-pole rotor, the polarity of which changes according to the position of the rotor, is constructed so that a constant magnetic flux is always present. Therefore, the magnetic energy in the motor can be basically made constant regardless of the rotor rotational position. If the excitation windings are all connected in series and pass excitation current, the magnetic flux of one of the windings decreases during rotation to generate a negative voltage, and at the same time the magnetic flux of one of the other windings increases to generate a positive voltage. Therefore, the total voltage of all the excitation windings connected in series is only a voltage drop of the resistance of the windings, and a voltage is basically not generated from fluctuations in magnetic flux. Therefore, only an extremely simple excitation control for the drive apparatus is sufficient. Regarding the gap between adjacent stator poles, a small gap minimizes any adverse effects, and even if relatively large, the adverse effects can be reduced by skewing either the rotor or stator.

Since the generation of torque is obtained from electromagnetic attraction, passing a torque current through the torque windings of the stator pole in the direction of torque to be generated enables the desired torque to be generated. Performing this operation along with the rotation for the stator winding of each stator pole in sequence enables a continuous rotational torque to be generated. There are rotational positions where the stator poles and rotor salient poles-either completely oppose or completely do not oppose each other. Using these rotational positions to change the current in the torque windings enables control to be performed so that torque ripple is not generated.

DETAILED DESCRIPTION OF THE PREFERRED EMBODIMENTS

Figure 1:
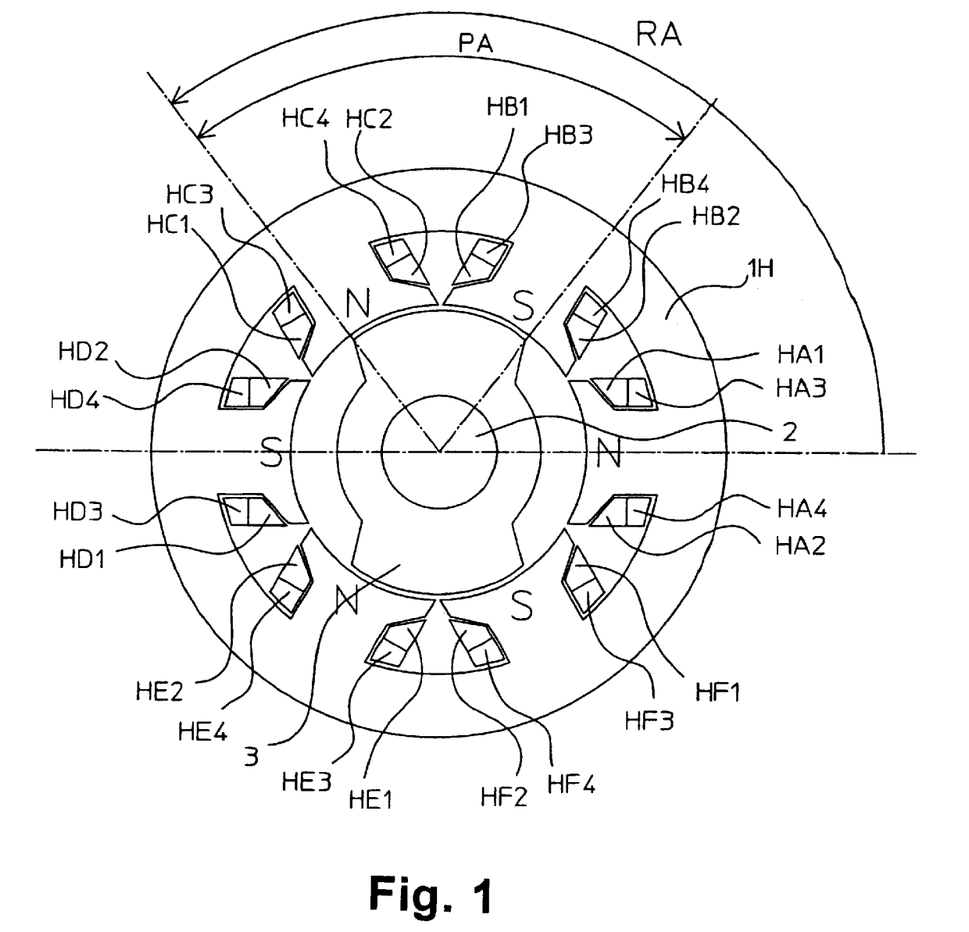
FIG. 1 is a block diagram of a rotor and a stator showing a preferred embodiment of the present invention.

An embodiment of the present invention is shown in FIG. 1. A stator 1H is provided with six stator poles having widths of about 60 degrees, which is less than 60 degrees in terms of rotor rotational angle. Each stator pole is provided with excitation windings denoted by HA3 and HA4, HB3 and HB4, HC3 and HC4, HD3 and HD4, HE3 and HE4, and HF3 and HF4, and torque windings denoted by HA1 and HA2, HB1 and HB2, HC1 and HC2, HD1 and HD2, HE1 and HE2, and HF1 and HF2. Of these symbols, "A", "B", "C", "D", "E", and "F" denote each stator pole. Stator 1H has silicon steel plates of the shape shown in FIG. 1 laminated along the direction of a shaft.

A rotor 3 has a shaft 2. The rotor 3 has salient poles having widths of approximately 80 degrees in terms of rotor rotational angle. If a width PA of the salient pole of the rotor is from 60 degrees to 120 degrees, a signed two direction torque can be generated at various rotational positions. As will be described later, skewing either the rotor or stator causes a limit value of the stator pole width or rotor pole width to change.

Figure 2:
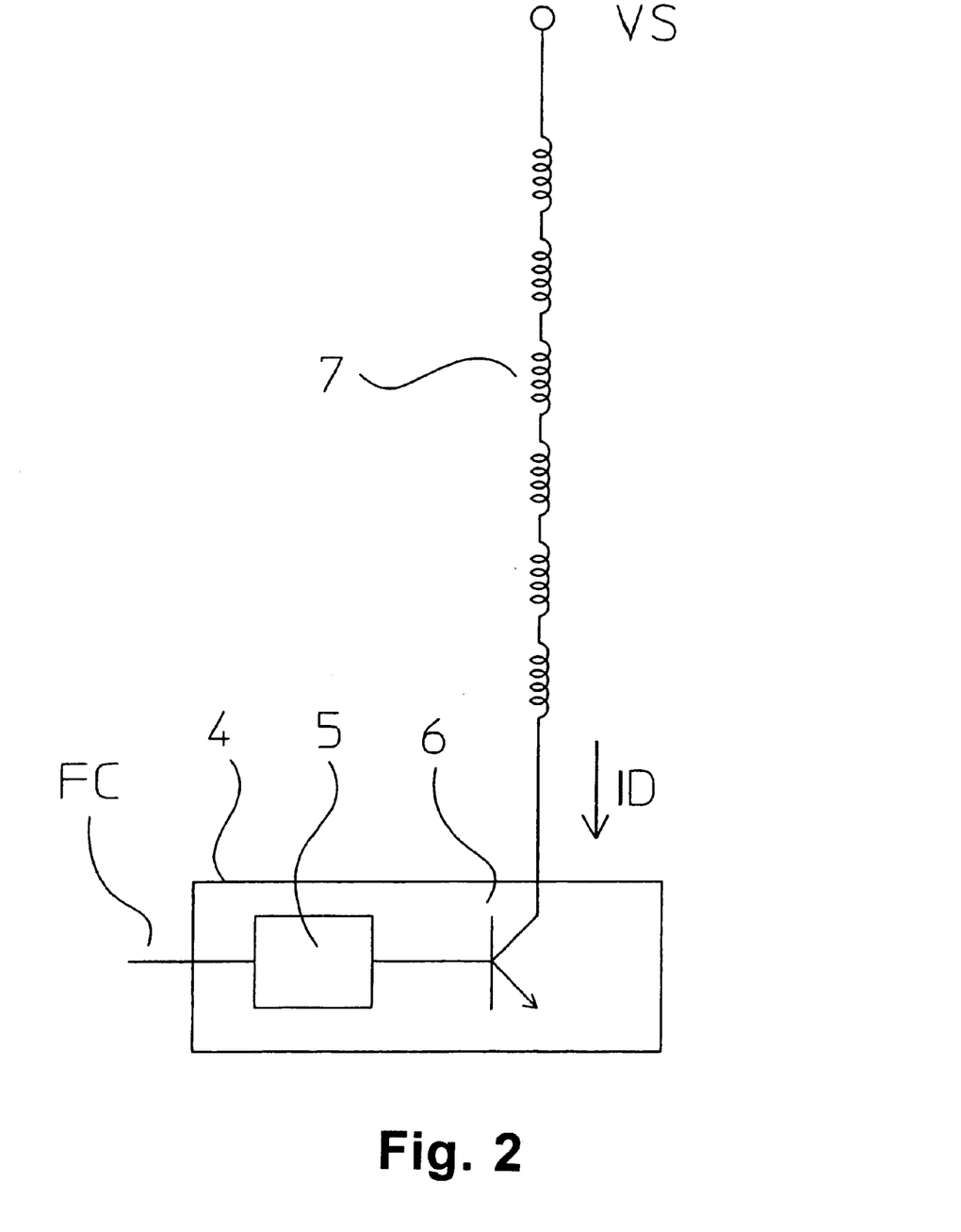
FIG. 2 is an excitation winding and excitation current drive circuit of the motor in FIG. 1.

FIG. 2 shows a connection relationship of the excitation windings and a control example of the excitation current. Adjacent excitation windings 7 are wound in an opposite direction and the six windings are connected in series. Namely, the excitation windings are connected in reverse series. The figure shows an excitation current command FC, an excitation current drive circuit 4, a current controller 5, a drive transistor 6, an excitation current ID, and a supply voltage VS. Such details as a flywheel diode are omitted. The excitation windings 7 and the excitation current ID cause the stator poles of FIG. 1 to be excited by poles N and S of FIG. 1.

In this manner, the outer perimeter of rotor 3 is excited at any rotational position by pole N or S. Although the polarity of the magnetic flux changes with rotor position, the structure causes a constant absolute value of the magnetic flux to be always present. Therefore, the magnetic energy within the motor can be basically made constant regardless of the rotor rotational position. If the excitation windings are all connected in series and conduct excitation current, in one of the excitation windings the magnetic flux decreases and a negative voltage is generated by the rotation, and simultaneously in one of the other excitation windings the magnetic flux increases and a positive voltage is generated. Therefore, the total voltage of all the excitation windings connected in series is only a voltage drop of the resistance of the windings, and a voltage is basically not generated from fluctuations in magnetic flux. Therefore, only an extremely simple excitation control for the drive apparatus is sufficient. The simplest example is to connect a dc voltage supply to both ends of each excitation winding connected in series.

The same effect can also obtained by dividing each three-phase excitation winding into two sets and connecting an excitation current drive circuit to each set.

Generally, when performing control at a high-speed rotation, a load on the excitation current drive of the control apparatus becomes large. However, the system of FIG. 2 has an advantage in that the load on the control apparatus is reduced since magnetic energy is freely transferred between excitation windings.

In the above-mentioned configuration, a rotational torque is not generated with the magnetic energy at a constant level. From another point of view, however, in this phenomenon, a positive torque and a negative torque are generated at both ends of the rotor and cancel each other.

Regarding the gap between adjacent stator poles, a small gap minimizes any adverse effects, and even if relatively large, the adverse effects can be reduced by skewing either the rotor or stator.

Figure 3:
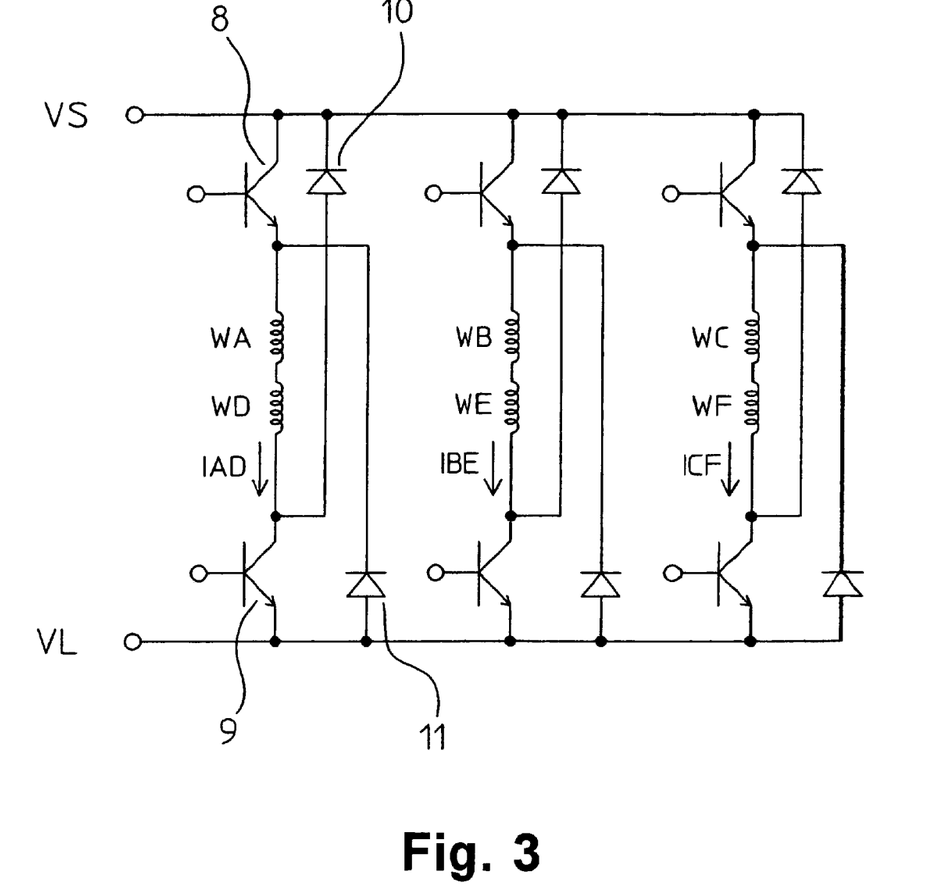
FIG. 3 is a torque winding and torque current drive circuit of the motor in FIG. 1.

FIG. 3 shows an example of a drive circuit for driving the torque windings of the stator. WA is a torque winding indicated by HA1 and HA2 and WD is a torque winding indicated by HD1 and HD2. Also shown are drive transistors 8 and 9, and regenerative flywheel diodes 10 and 11. WA and WD are wound in a direction opposite to each other and connected in series. It should be noted that the direction of current in the excitation windings of the stator poles coincide with that in the torque windings. When a torque current IAD is to be conducted, transistors 8 and 9 are turned on. When transistors 8 and 9 are turned off, the current IAD is regenerated at supply VS and VL through flywheel diodes 10 and 11. VL is a common line for the power circuit. The operations are also identical for the windings of the other two phases WB and WE, and WC and WF.

Figure 4:
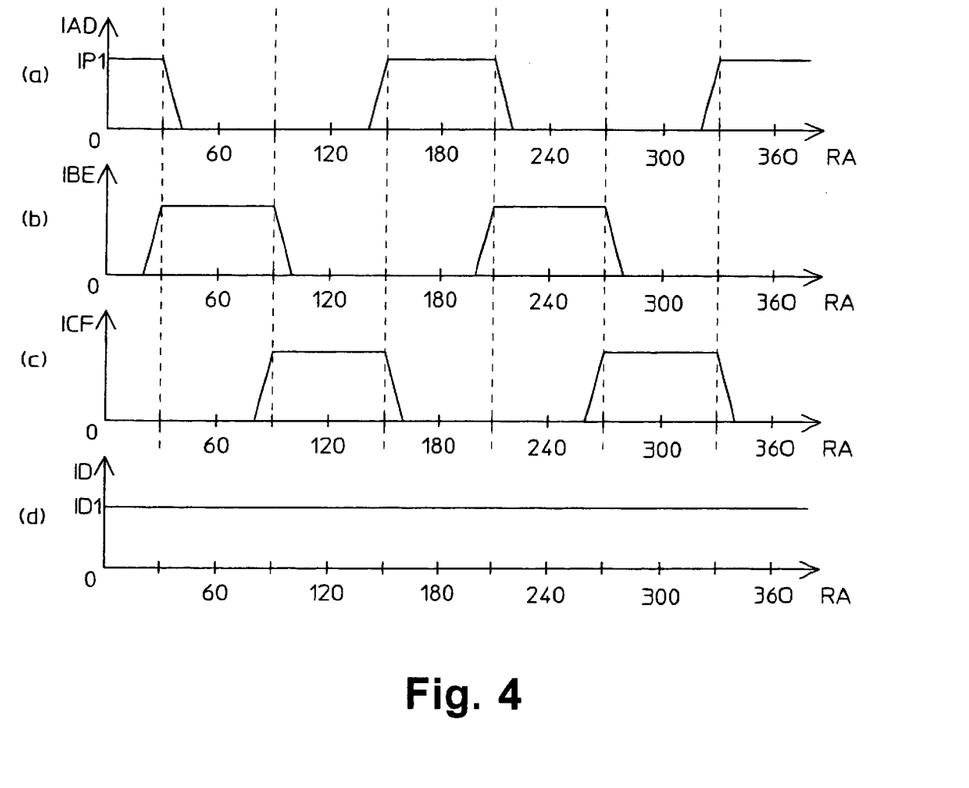
FIG. 4 shows characteristics of the torque current and rotor rotational angle for FIG. 1.
Figure 5:
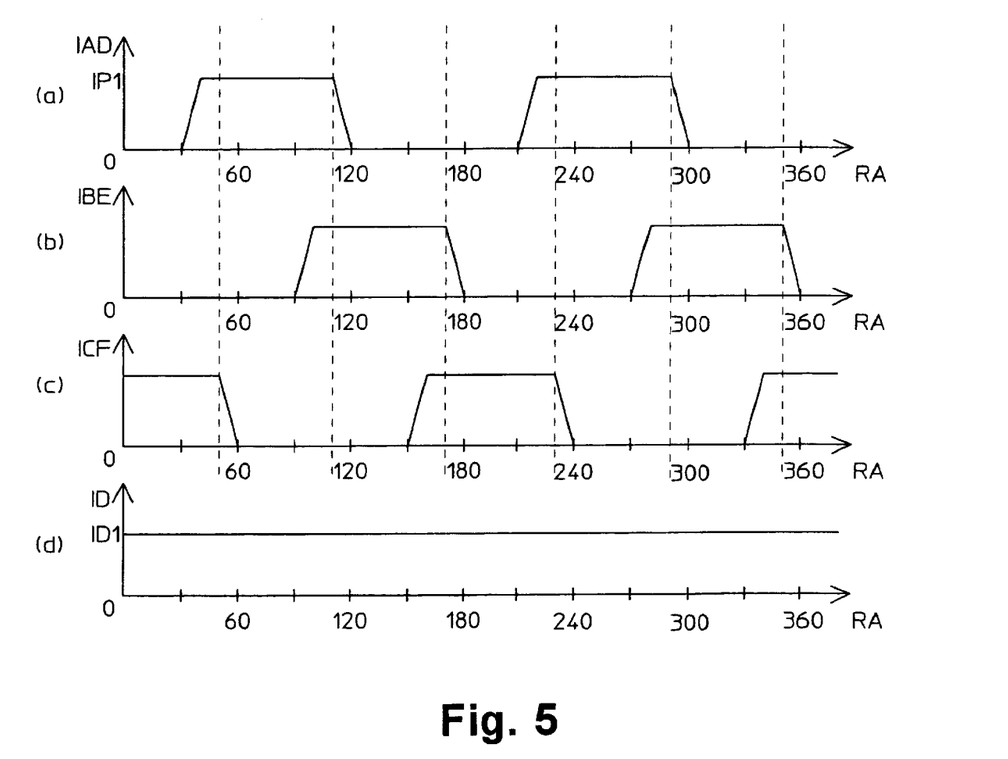
FIG. 5 shows characteristics of the torque current and rotor rotational angle for FIG. 1.

Next, relationships between torque generation and each winding are shown in FIGS. 4 and 5 as characteristics of various currents and rotational angle RA. In FIG. 1, the angle of the rotor salient pole edge in the counterclockwise direction with respect to the center line of the rotor drawn horizontally is defined as RA. An instance where a torque is continuously generated in the counterclockwise direction corresponding to current IP1 is described. It should be noted that the direction of the generated torque and the direction of rotation of the rotor 3 are not necessarily identical. Namely, since the direction of the generated torque is determined by the current in the windings and the rotational position of the rotor, it is unrelated to the rotational direction or rotational speed of the rotor 3. Thus, for example, it is possible for a torque in the counterclockwise direction to be generated when the rotor 3 rotates in the clockwise direction or a torque in the clockwise direction to be generated when the rotor 3 rotates in the counterclockwise direction.

First, as shown in FIG. 4(*d*), excitation current ID is a constant value ID1 unrelated to the rotational angle RA. Assuming rotational angle RA gradually increases from zero, with RA at zero, current IAD of windings WA and WD is set to IP1 and the other currents IBE and ICF are set to zero. When RA is between zero to 30 degrees, windings WA and WD generate torque. When RA reaches 20 degrees, current IBE of windings WB and WE begins to increase, and when RA reaches 30 degrees, the current value increases to IP1. Torque is not yet generated since the rotor salient pole has not yet reached the stator pole for windings WB and WE, and this time is a preparatory operation for subsequent torque generation. When RA increases from 30 degrees to 90 degrees, windings WB and WE generate torque. Simultaneously at this time, when RA is between 30 degrees and 40 degrees, current IAD is decreased from IP1 to zero. During this time, the stator pole wound with windings WA and WD is completely opposed against the rotor salient pole so as basically not to contribute to the generation of torque. When RA is between 80 degrees and 90 degrees, current ICF flowing through windings WC and WF is increased from zero to IP1 to prepare for torque generation, and when RA is between 90 degrees and 150 degrees, a torque is generated from current ICF. Simultaneously, when RA is between 90 degrees and 100 degrees, current IBE is decreased from IP1 to zero. Subsequently conducting the various currents in the same manner enables a constant torque to be generated in the counterclockwise direction with little torque ripple.

As with current IBE in windings WB and WE while RA is between 20 degrees and 30 degrees, current flows through these windings when torque is not generated and magnetic energy is stored so that immediately thereafter part of the stored magnetic energy is converted into rotational energy. Thus, the effect is that the driving efficiency of the drive apparatus can be raised.

The increase in current IBE was mentioned as being in the preparatory period. Strictly speaking, for example, when RA approaches 30 degrees from 20 degrees, the rotational torque significantly affects the magnetic flux distribution at the air gap on the side of the rotor salient pole and the gap of the stator pole so that in the vicinity of 30 degrees, current IBE affects torque generation. Therefore, it is preferable to advance this preparatory period, for example, by 15 degrees to 25 degrees.

Next, an instance where a torque in the clockwise direction corresponding to current IP1 is continuously generated is described. First, excitation current ID is constant at ID1 and unrelated to rotational angle RA as shown in FIG. 5(*d*). Assuming rotational angle RA gradually increases from zero, current ICF of windings WC and WF at a position where RA is zero is set to IP1 and the other currents IAD and IBE are set to zero. When RA is from zero to 50 degrees, windings WC and WF generate torque. When RA reaches 30 degrees, current IAD of windings WA and WD begins to increase, and when RA reaches 40 degrees, the current value is increased to IP1. When RA is between 30 degrees and 50 degrees, the stator pole wound with windings WA and WD completely opposes the rotor salient pole so that the generation of torque is basically not affected. This is a preparatory operation for subsequent torque generation. When RA is between 50 degrees and 110 degrees, windings WA and WD generate torque. Simultaneously, when RA is between 50 degrees and 60 degrees, current ICF is decreased from IP1 to zero. Since the stator pole wound with windings WC and WF does not oppose the rotor salient pole completely during this time, there is basically no affect on the generation of torque. When RA is between 90 degrees to 100 degrees, current ICF that flows in windings WB and WE is increased from zero to IP1 to prepare for torque generation, and when RA is between 110 degrees to 170 degrees, torque is generated from current IBE. Simultaneously, when RA is between 110 degrees to 120 degrees, current IAD is decreased from IP1 to zero. Subsequently conducting the various currents in the same manner enables a constant torque to be generated in the clockwise direction with little torque ripple.

The generation of torque is determined by the relationship between the various currents and the rotational position, and is unrelated to the direction of rotation and rotational speed as described above.

There are rotational positions where the stator poles and rotor salient poles either completely oppose or completely do not oppose each other. Using these rotational positions to change the current in the torque windings enables control to be performed so that torque ripple is not generated.

Figure 6:
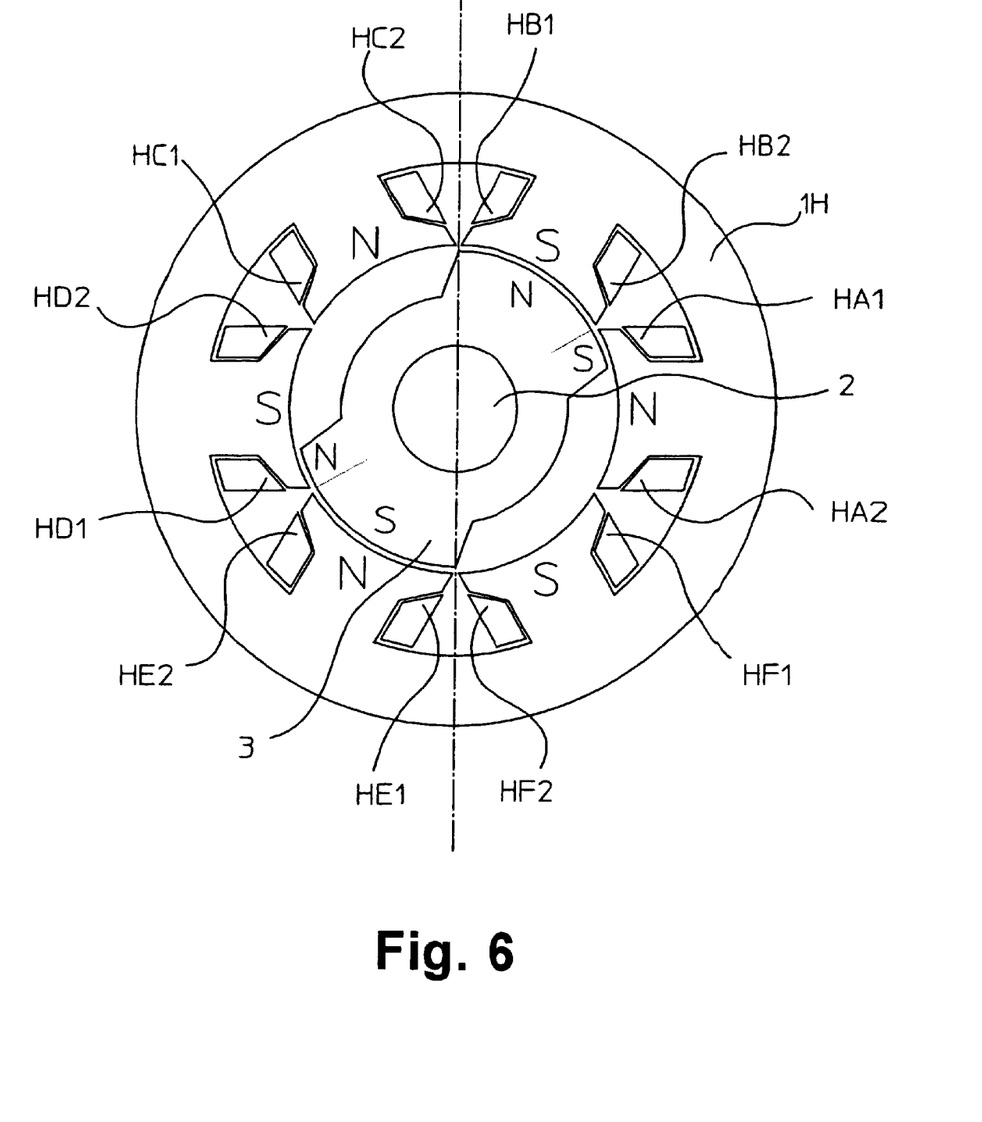
FIG. 6 is a block diagram of a rotor and a stator showing another preferred embodiment of the present invention.

Another embodiment of the present invention is shown in FIG. 6. This example is a motor having the stator excitation windings and torque windings in common. In terms of control, it is sufficient to control a value adding the excitation current ID and each torque current for each phase current, and is theoretically not difficult.

Advantages of the motor in FIG. 6 compared to the motor shown in FIG. 1 are that the windings are simplified, and the circuitry is simplified since the excitation circuit shown in FIG. 2 in the control circuit is unnecessary. On the other hand, disadvantages are that the motor terminal voltage during high-speed rotation is greater than that for the motor shown in FIG. 1 causing an increase in load on the drive circuit, and the motor current increases by the amount of excitation current so that it is necessary to increase the current capacity of the drive circuit. Therefore, since the relative merits of the motor of FIG. 1 and the motor of FIG. 6 depend on the rotational speed and output power, the motor of FIG. 1 generally is advantageous for high-speed rotation and high output power.

Next, the relationship of the magnetism of pole N and pole S of the rotor, gap PG between the stator poles, pole width PA of the rotor salient pole, and skew angle SA of the rotor will be described with reference to FIGS. 6 and 7.

The magnetism of the salient poles of rotor 3 of FIG. 6 is determined by the magnetism of the stator poles. The rotor rotates while the salient poles of the rotor change to pole N and pole S along with the rotation. This operation is the same as for the motor of FIG. 1.

Figure 7:
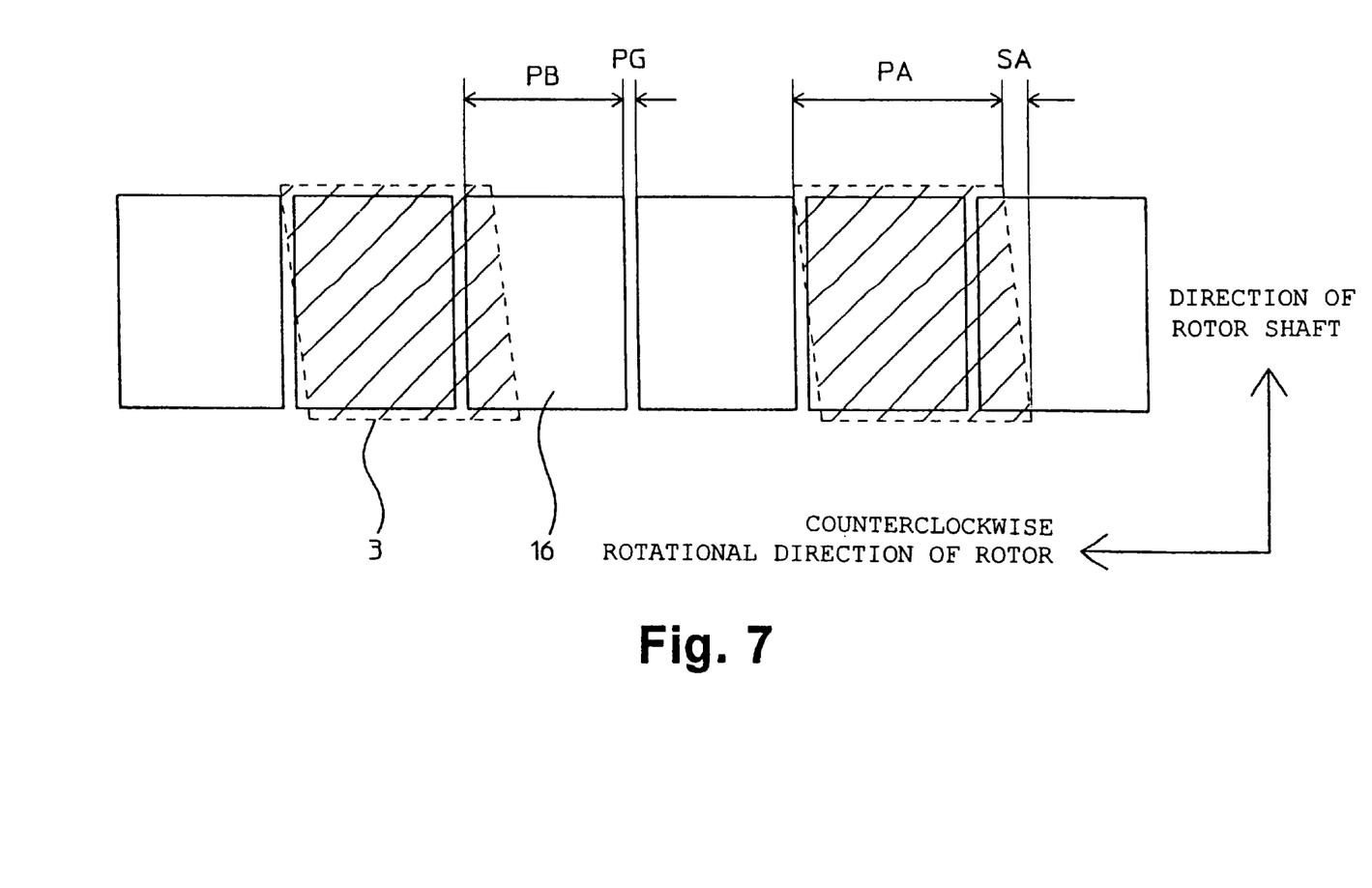
FIG. 7 shows the relationship between stator pole shape and rotor salient pole.

The inner perimeter of the stator and the outer perimeter of the rotor of the motor in the state shown in FIG. 6 is shown as a planar development in FIG. 7. The bottom to top of the figure is the direction of the rotor shaft and the right to the left is the counterclockwise direction of the rotor with the right end to the left end forming an angle of 360 degrees in terms of rotor rotational angle. The rotor salient pole 3 is indicated by broken lines and crosshatching and the stator poles are the rectangles indicated by solid lines. PA is an angle of 80 degrees corresponding to the width of the rotor salient pole and SA is an angle corresponding to the skew. PB is the rotor rotational angle of the stator pole and PG is the rotor rotational angle corresponding to the gap between stator poles. The sum of PB and PG is 60 degrees. An instance where skew SA is zero will be considered first. Since the generation of torque results from magnetic attraction, passing torque current through the torque winding of the stator pole in the desired direction of torque among the stator poles that the rotor opposes enables the desired torque to be generated. Performing this operation along with the rotation for the stator winding of each stator pole in sequence enables a continuous rotational torque to be generated. However, if the left end of the rotor approaches the gap of the stator pole when it is desired to drive-the rotor toward the left in FIG. 6, for example, even if current is passed through the winding of the stator pole on the left side of the rotor, a magnetic flux is not generated with the rotor so that a torque is simply not generated. However, when the rotor is skewed as shown in FIG. 7, both sides of the stator poles respectively face a little at a time the rotor poles even in the gap between the stator poles, by the amount the rotor poles are skewed so that both stator poles can simultaneously generate torque in the same direction. For this reason, smooth torque transitions become possible. Sudden changes in torque are decreased for each stator pole so that vibrations of the stator poles decrease and vibrations and noise are reduced. Strictly speaking, even if the skew is zero and the left end of the rotor pole approaches the stator pole gap, a magnetic flux is generated in the space between the rotor and the stator pole on the left side of the rotor so that a torque is generated.

Figure 11:
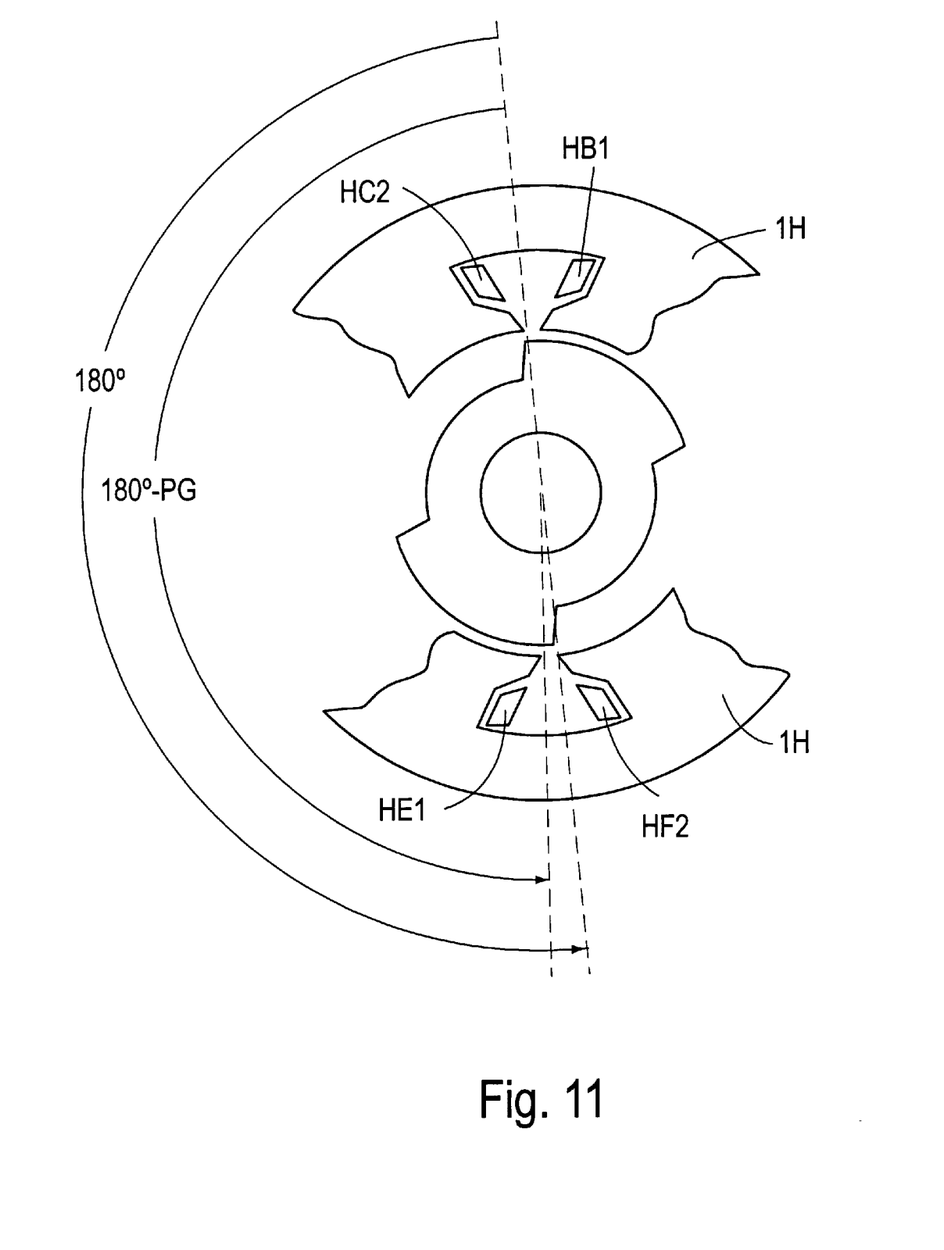
FIG. 11 illustrates a partial view of a rotor and stator showing an alternative embodiment of the invention.

A certain amount of torque ripple is generated when one end of the rotor approaches the gap between stator poles. To cope with this, it is preferable for the positions of the two rotor poles to be arranged not at positions of 180 degrees of rotor rotational angle but to be shifted by an amount corresponding to the gap between the stator poles. This reduces the change in magnetic resistance during rotation and reduces torque ripple. For example, rather than having symmetrically aligned rotors, as shown in FIG. 1, opposite rotor poles are non-aligned with respect to each other by an amount corresponding to the stator pole gap, as shown in FIG. 11.

Figure 8:
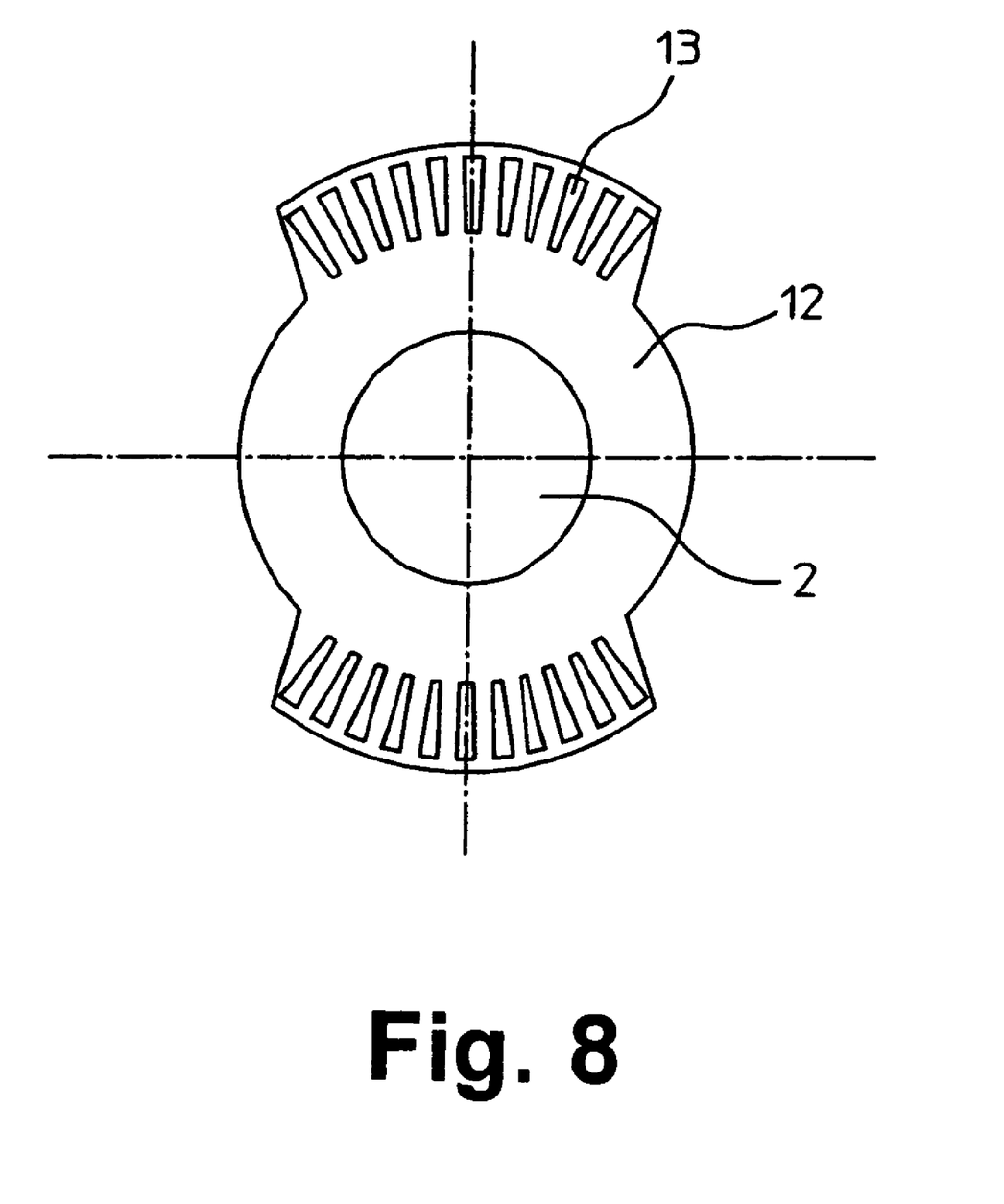
FIG. 8 illustrates an example of rotor shape.
Figure 9:
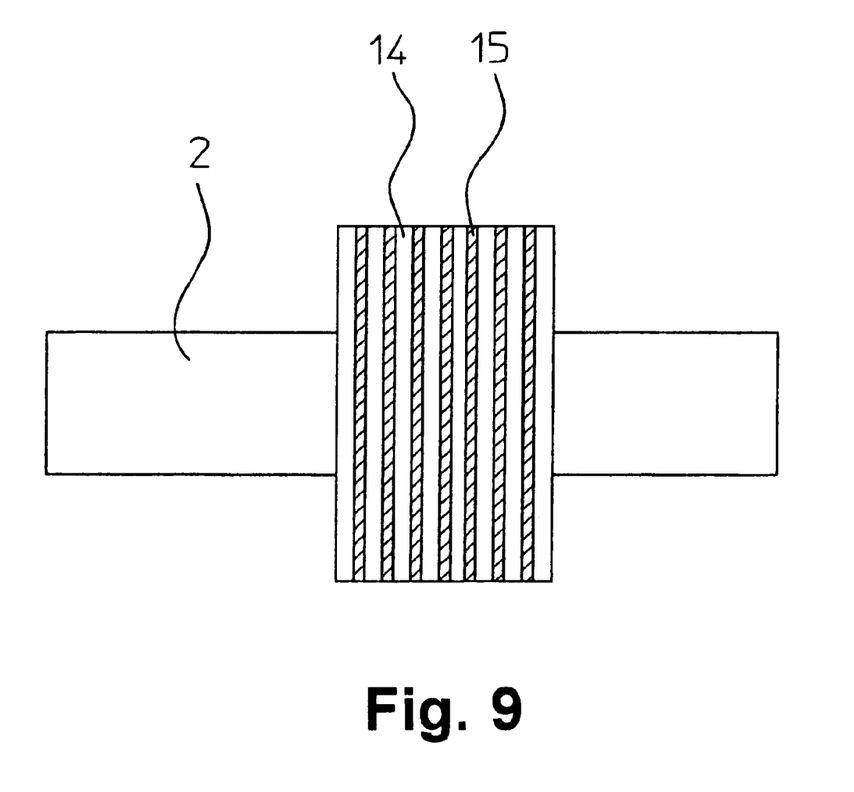
FIG. 9 illustrates an example of rotor shape.

For the space for the various windings of the stator, for example, a salient pole having a width identical to the inner perimeter of the stator pole can be configured to the yoke of the stator outer perimeter so that the empty space can be used for the stator windings. However, since the winding space is small in this case, the size of the motor becomes large in order to secure sufficient winding space. Another method to secure winding space is to reduce the thickness of the base of the stator poles as shown in FIGS. 1 and 6 for the stator winding space. Although the sides of the winding spaces in FIGS. 1 and 6, such as HA1 and HA2, are typically shown, windings can of course be wound in the empty spaces. Since the magnetic flux density of the narrow parts in FIG. 1 saturates, it is preferable in terms of motor operation to limit the amount of magnetic flux of the salient pole on the rotor side so as to prevent saturation. As shown in FIG. 8, one method to limit the amount of magnetic flux at the rotor is to distribute slits 13 in the space at the salient poles of a rotor 12 so as to limit the maximum total amount of magnetic flux at the rotor salient poles. Another method, as shown in FIG. 9, is to provide at sufficient intervals air gaps 15 or non-magnetic materials, such as stainless steel plates, between rotor silicon steel plates 14 laminated along the direction of the shaft so as to limit the maximum total amount of magnetic flux at the rotor.

The motor concerned with in the present invention can have various applications and modifications, which are also included in the present invention. For example, it is possible to double the number of poles of the motors in FIGS. 1 and 6, or to omit some poles or windings. In the motors in FIGS. 1 and 6, it is also possible to provide an intermediate tap in each winding so that when the motor is to be operated at a speed exceeding a base rotational speed, the motor drive apparatus connects to the intermediate tap. In other words, high-speed rotation can be realized through a winding switching system.

The motor concerned with in the present invention can also be modified as a linear motor if developed linearly. Furthermore, in order to reduce windage loss and to reduce noise, it is effective to round the shape of the inner perimeter of the stator and the outer perimeter of the rotor by using, for example, a non-magnetic material or part of a silicon steel plate.

As described in the preceding, a motor having an extremely strong two-pole rotor configured with only an electromagnetic steel plate can be realized according to the present invention so that a faster rotation can be realized. Furthermore, since torque can be continuously generated at each salient pole of the rotor along with the rotation of the rotor, the torque ripple is small, and a motor having low vibration and low noise can be realized. Also, the supply and storage of magnetic energy in the motor can be realized with excitation windings and a simple excitation circuit so that the driving operation at high-speed rotation is simple and so that the required capacity of the drive transistor for driving the torque windings can be reduced. Moreover, the motor construction is simple compared to a general-purpose induction motor so that a low cost motor can be realized.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A motor comprising:
   a rotor having two rotor poles, each with an angular width of between 60 degrees and 120 degrees about an axis of rotation of the rotor;
   a stator including six stator poles spaced radially about the axis of rotation of the rotor, each of the six stator poles having an angular width of approximately 60 degrees; and
   common stator windings wound around each stator pole,
   wherein a gap of a predetermined size is provided between adjacent stator poles, and the rotor poles are non-aligned with respect to each other by an amount corresponding to the gap.

2. The motor according to claim 1 wherein holes or grooves are disposed on an outer perimeter of the rotor so as to limit a total magnetic flux of the rotor poles.

3. The motor according to claim 1 wherein air gaps or non-magnetic materials are disposed between rotor steel plates laminated along a direction of a rotor shaft so as to limit a total magnetic flux of the rotor poles.

4. The motor according to claim 1, wherein the rotor is fabricated from magnetic steel plates having a saturation magnetic flux density lower than a saturation magnetic flux density of magnetic steel plates of the stator.

5. A motor comprising:

a rotor having two rotor poles, each with an angular width of between 60 degrees and 120 degrees about an axis of rotation of the rotor;

a stator including six stator poles spaced radially about the axis of rotation of the rotor, each of the six stator poles having an angular width of approximately 60 degrees;

excitation windings wound around each stator pole, said excitation windings of adjacent stator poles being connected in reverse series; and torque windings wound around each stator pole, said torque windings having three phases with the windings of each phase comprising a pair on opposite sides with respect to the center of rotor rotation, separated from each other by 180 degrees, and connected in reverse series.

6. The motor according to claim 5, wherein a gap of a predetermined size is provided between adjacent stator poles and the rotor poles are non-aligned with respect to each other by an amount corresponding to the gap.

7. The motor according to claim 5 wherein holes or grooves are disposed on an outer perimeter of the rotor so as to limit a total magnetic flux of the rotor poles.

8. The motor according to claim 5 wherein air gaps or non-magnetic materials are disposed between rotor steel plates laminated along a direction of a rotor shaft so as to limit a total magnetic flux of a rotor poles.

9. The motor according to claim 5, wherein the rotor is fabricated from a magnetic steel plate having a saturation magnetic flux density lower than a saturation magnetic flux density of magnetic steel plates of the stator.

10. A motor comprising:

a rotor having two rotor poles, each with an angular width of between 60 degrees and 120 degrees about an axis of rotation of the rotor;

a stator including six stator poles spaced radially about the axis of rotation of the rotor, each of the six stator poles having an angular width of approximately 60 degrees;

excitation windings wound around each stator pole; and torque windings wound around each stator pole, wherein a gap of a predetermined size is provided between adjacent stator poles and the rotor poles are non-aligned with respect to each other by an amount corresponding to the gap.

11. The motor according to claim 10, wherein:

excitation windings of adjacent stator poles are connected in reverse series; and torque windings have three phases with the windings of each phase comprising a pair on opposite sides with respect to the center of rotor rotation, separated from each other by 180 degrees, and connected in reverse series.

12. The motor according to claim 10, wherein holes or grooves are disposed on an outer perimeter of the rotor so as to limit a total magnetic flux of the rotor poles.

13. The motor according to claim 10, wherein air gaps or non-magnetic are disposed between rotor steel plates laminated along a direction of a rotor shaft so as to limit a total magnetic flux of the rotor poles.

14. The motor according to claim 10, wherein the rotor is fabricated from a magnetic steel plate having a saturation magnetic flux density lower than a saturation magnetic flux density of magnetic steel plates of the stator.

* * * * *